(12) United States Patent
Remy et al.

(10) Patent No.: US 10,259,156 B2
(45) Date of Patent: Apr. 16, 2019

(54) INSTALLATION FOR THERMALLY CONDITIONING PREFORMS WITH ONE PORTION OF THE PREFORM BEING COOLED BY A BLOWN BLADE OF AIR

(71) Applicant: SIDEL PARTICIPATIONS, Octeville-sur-mer (FR)

(72) Inventors: Mikael Remy, Octeville-sur-mer (FR); Stephane Hebert, Octeville-sur-mer (FR); Pascal Haboury, Octeville-sur-mer (FR); Damien Cirette, Octeville-sur-mer (FR); Sebastien Fevre, Octeville-sur-mer (FR); Eric Lemaistre, Octeville-sur-mer (FR); Mikael Derrien, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 216 days.

(21) Appl. No.: 15/111,393

(22) PCT Filed: Feb. 4, 2015

(86) PCT No.: PCT/EP2015/052266
§ 371 (c)(1),
(2) Date: Jul. 13, 2016

(87) PCT Pub. No.: WO2015/121122
PCT Pub. Date: Aug. 20, 2015

(65) Prior Publication Data
US 2016/0346988 A1    Dec. 1, 2016

(30) Foreign Application Priority Data
Feb. 13, 2014    (FR) .................................... 14 51119

(51) Int. Cl.
*B29C 49/64* (2006.01)
*B29C 49/68* (2006.01)
(Continued)

(52) U.S. Cl.
CPC .......... *B29C 49/6445* (2013.01); *B29C 49/12* (2013.01); *B29C 49/6409* (2013.01);
(Continued)

(58) Field of Classification Search
CPC ............ B29C 49/6409; B29C 49/6445; B29C 49/68; B29C 49/6436
See application file for complete search history.

(56) References Cited

U.S. PATENT DOCUMENTS 4,076,071 A * 2/1978 Rosenkranz .......... B29B 13/023
165/263
4,151,249 A * 4/1979 Lee ...................... B29C 49/6436
215/382
(Continued)

FOREIGN PATENT DOCUMENTS

DE             3101282 A1 * 8/1982 ............. B29C 49/68
DE    10 2009 057 021 A1    6/2011
(Continued)

OTHER PUBLICATIONS

Partial machine translation of DE3101282A1 dated Aug. 1982 obtained from the espace website. (Year: 1982).*
(Continued)

*Primary Examiner* — Robert B Davis
(74) *Attorney, Agent, or Firm* — Young & Thompson

(57) ABSTRACT

An installation (26) for thermally conditioning thermoplastic preforms (14) that are intended to be formed, the installation (26) including:—a thermal-conditioning zone (40) divided vertically into a heating first part (42) which is intended to house a body (16) of the preform (14) and a
(Continued)

cooling second part (44) which is intended to house a neck (20) of the preform (14);—a device (62) for cooling a portion of the preform (14) by producing a stream of gas passing through the thermal-conditioning zone (40); characterized in that the cooling device (62) produces a blade (63) of gas blown with laminar flow through an axial outlet slit (72).

21 Claims, 6 Drawing Sheets

(51) Int. Cl.
  *B29C 49/12*  (2006.01)
  *B29C 49/06*  (2006.01)
  *B29K 667/00*  (2006.01)
  *B29L 31/00*  (2006.01)

(52) U.S. Cl.
  CPC .............. *B29C 49/68* (2013.01); *B29C 49/06* (2013.01); *B29K 2667/003* (2013.01); *B29L 2031/712* (2013.01)

(56) References Cited

U.S. PATENT DOCUMENTS

| | | | | |
|---|---|---|---|---|
| 4,606,723 | A * | 8/1986 | Pasternicki | B29C 49/68 219/388 |
| 5,714,109 | A * | 2/1998 | Diller | B29C 35/04 264/40.6 |
| 6,632,087 | B1 * | 10/2003 | Armellin | B29C 49/68 425/174.4 |
| 6,909,290 | B2 * | 6/2005 | Imai | G01R 31/34 324/545 |
| 7,121,821 | B2 * | 10/2006 | Pickel | B29C 49/6445 425/174.4 |
| 7,553,156 | B2 * | 6/2009 | Doudement | B29C 49/68 425/174.4 |
| 7,649,158 | B2 * | 1/2010 | Doudement | B29C 49/68 219/388 |
| 2007/0085243 | A1 * | 4/2007 | Doudement | B29C 49/68 264/521 |
| 2010/0052224 | A1 | 3/2010 | Humele et al. | |
| 2011/0256493 | A1 | 10/2011 | Schoenberger et al. | |

FOREIGN PATENT DOCUMENTS

| | | | | |
|---|---|---|---|---|
| DE | 10 2010 026 166 A1 | | 1/2012 | |
| EP | 2 377 668 A2 | | 10/2011 | |
| EP | 2 380 719 A2 | | 10/2011 | |
| FR | 2950284 A1 | * | 3/2011 | ......... B29C 49/6445 |
| JP | 2012020574 A | * | 2/2012 | ......... B29B 13/024 |

OTHER PUBLICATIONS

International Search Report, dated Mar. 9, 2015, from corresponding PCT Application.

* cited by examiner

INSTALLATION FOR THERMALLY CONDITIONING PREFORMS WITH ONE PORTION OF THE PREFORM BEING COOLED BY A BLOWN BLADE OF AIR

TECHNICAL FIELD OF THE INVENTION

The invention relates to an installation for thermal conditioning, in series production, of cold preforms that are intended to be transformed into finished containers by forming, particularly by stretching or stretch blow molding.

TECHNICAL BACKGROUND OF THE INVENTION

The invention relates more particularly to an installation for thermal conditioning, in series production, of cold preforms of thermoplastic material intended to be transformed into finished containers by forming, each preform having a vertical main axis that goes through a neck, the installation having:
- at least one element for holding a preform by its neck in a thermal conditioning zone, the thermal conditioning zone being divided vertically into a first heating part that is intended to accommodate a body of the preform, the heating part being exposed to at least one element for heating the body of the preform, and a second cooling part that is intended to accommodate the neck of the preform;
- at least one cooling device for at least one portion of the surface of the preform by producing a gas flow, in particular air, which passes through the thermal conditioning zone.

The preforms are generally obtained by injection of a thermoplastic material. Then, they are cooled and stored for their subsequent transformation into finished containers. Obtaining the finished container is performed during a forming operation, for example by blow molding or by stretch blow molding, of the walls of the preform.

The preforms traditionally have a body that is intended to be deformed during the forming operation, and a neck that is already molded to its final shape. It is therefore important to protect the neck of the preform so that it is neither deformed nor damaged during the production of the finished container.

To do this, the preform is thermally conditioned just before the forming operation by passing into the thermal conditioning installation. In this installation, the body of the preform is rendered malleable by heating the thermoplastic material that constitutes its walls beyond a glass transition temperature, while the neck is kept at a temperature that is lower than said glass transition temperature to avoid any deformation of the neck.

For this purpose, the thermal conditioning installation is designed so that the preform portions to be heated, i.e., the body, are received in a heating part of the installation, while the portions of the preform that must remain "cold" are received in a cooling part of the installation.

Concerning a thermal conditioning installation in large quantities of preforms, the preforms are mounted on a mobile support in such a way as to make possible the routing, generally in a line, of the preforms to a station for forming during their thermal conditioning.

To keep the neck of the preform at a cold temperature, it is known to have a first flow of cold air circulate in the cooling part of the installation. This air flow is generally transverse in relation to the direction of movement of the preforms, and it is oriented at right angles to a main axis of the preforms.

To produce this flow of air, it is well known to use fans, which agitate the air to obtain a turbulent air flow. The turbulent air flow is carried to the cooling part through ducts.

In addition, it is also known to have a second turbulent air flow, separate from the first cold air flow but parallel to it, circulate in the heating part. This makes it possible to guarantee that the body of the preform is heated homogeneously. This also makes it possible not to damage the outer skin of the preform while controlling the temperature gradient in the thickness of the wall of the preform. The temperature of the air of this second turbulent air flow rises rather quickly as a consequence of the ambient heat of the heating part.

It is also known to use a fan to obtain this second turbulent air flow.

To reduce the thermal exchanges between the hot part and the cold part, it is also known to provide rails along the path of the preforms. These rails make it possible to reduce the opening between the two parts of the installation. These two rails are cooled by internal circulation of a heat-transfer liquid.

Nevertheless, it has been observed that the turbulent air flow used to regulate both the temperature of the neck and that of the body does not make it possible to obtain an optimal temperature for certain portions of the preform.

A preform thus thermally conditioned actually has a very considerable temperature gradient, particularly in a segment of the body located against the neck. Such a segment will hereafter be called "under-neck segment."

Thus, a marginal part of the first turbulent air flow, used to cool the neck, goes through the space reserved between the two rails to cool down the temperature slightly of the under-neck segment. The result is that the stretching of this under-neck segment must be treated specifically during the forming operation, particularly by controlling a stretching rod. This causes difficulties of adjustment during the forming operation.

Likewise, the second air flow has as its object to homogenize the temperature of the body. Nevertheless, the preform has, at its closed end, an injection point that is made of the thermoplastic material in a low stretch state. It would therefore be advantageous to be able to heat the body portion located in the direct vicinity of this injection point to facilitate its stretching during the forming step.

Moreover, the fans and the ducts used to guide the turbulent air flow are extremely bulky. Such ventilation equipment can sometimes occupy more than half of the space for the thermal conditioning installation.

BRIEF SUMMARY OF THE INVENTION

The invention proposes a thermal installation of the type described above, characterized in that the cooling device produces a blade of blown gas having a laminar flow through an axial outlet slot that is at right angles to its direction of flow.

According to other characteristics of the invention:
- the cooling device has a pressure chamber that is supplied with compressed gas, one side of which forms a linear converging nozzle that comes out through the outlet slot for the blade of blown gas;
- the thermal conditioning zone forms a passageway through which the preforms pass at right angles to their vertical axis by movement of the holding elements;

the heating part and the cooling part are separated by two longitudinal separation rails that transversely delimit a longitudinal passage to make possible the advance of the preforms astride the two parts of the thermal conditioning zone;

the outlet slot for the blade of blown gas is oriented parallel to the direction of movement of the preforms;

the outlet slot of the cooling device is positioned in the vicinity of the cooling part, the direction of flow of the blade of blown gas being pointed toward the neck of the preforms;

the outlet slot is placed vertically at the same height as the neck of the preforms, the direction of flow of the blade of blown gas being perpendicular to the vertical axis of the preform;

the outlet slot is positioned vertically under the neck of the preform, the direction of flow of the blade of blown gas forming, with the vertical axis of the preform, an angle of inclination, the direction of flow being pointed, beyond the neck of the preforms, toward the passage delimited between the two rails;

the cooling device is mounted to move between a first position in which the direction of flow is directed transversely, and a second position in which the direction of flow is pointed toward the passage delimited between the two rails;

the cooling device is positioned under one of the rails;

a gap is maintained between the rail and the cooling device to make possible the suction of air, by Venturi effect, between the rail and the cooling device by the blade of blown gas;

the blade of blown gas is injected directly into the heating part;

the direction of flow of the blade of blown gas is directed parallel to the vertical axis of the preform;

the blade of blown gas is tangent to the body of the preform;

the axis of flow of the blade of blown gas is positioned at a specific transverse distance from the surface of the preform;

the outlet slot is mounted to slide transversely to make it possible to adjust the transverse position of the blade of gas blown in the heating part;

the direction of flow of the blade of blown gas is perpendicular to the vertical axis of the preforms, the blade of blown gas being pointed toward a specific segment to be cooled of the body of the preforms;

the outlet slot is mounted to move vertically to make it possible to select the segment to be cooled of the body;

the preforms pass through the thermal conditioning zone while rotating about themselves at a specific speed of revolution, the installation having a plurality of cooling devices, the outlet slot of each of said devices being positioned parallel to the axis of the preforms, each blade of blown gas being injected directly into the heating part, the direction of flow of each blade of blown gas being oriented normally in the direction of advance of the preforms, the blades of blown gas being separated from one another by a specific span so that a specific section of the body of each preform is cooled successively by each blade of blown gas;

the installation has vents that are positioned opposite the outlet slot relative to the heating part to make possible the venting of the blade of blown gas from the heating part.

BRIEF DESCRIPTION OF THE FIGURES

Other characteristics and advantages of the invention will be brought out in the course of reading the detailed description that will follow, for the understanding of which reference will be made to the accompanying drawings in which.

DETAILED DESCRIPTION OF THE FIGURES

In the description below, elements having an identical structure or similar functions will be designated by identical reference signs.

In the description below, longitudinal, vertical, and transverse orientations indicated by the trihedron "L, V, T" of the figures will be adopted in a nonlimiting way. These orientations form a reference attached to the element holding the preform, and they are used by way of geometric reference for the description of the figures.

Thus, the vertical orientation in particular does not make reference to the direction of gravity, the invention being applicable both to so-called "neck up" thermal conditioning installations and to so-called "neck down" thermal conditioning installations.

Likewise, the longitudinal orientation is used to indicate the tangent to the path of movement of the preforms. The invention is thus applicable equally to preforms being moved along a straight or curved route.

In the description and in the claims, the terms "cold" and "hot" relating to the preforms mean respectively below and above the glass transition temperature of the thermoplastic material constituting them.

Figure 1:
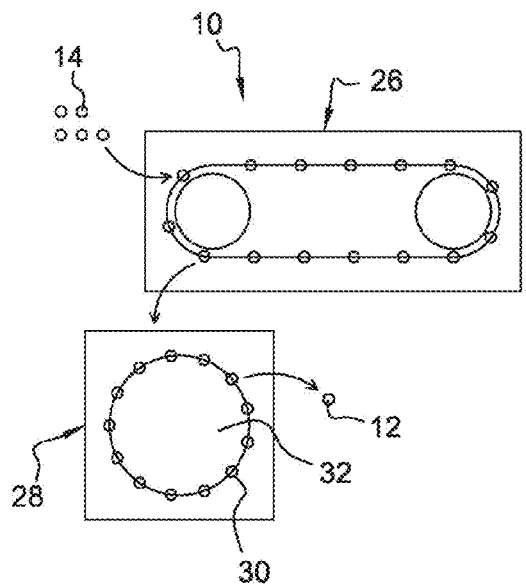
FIG. 1 is a schematic top view that shows a series production line of finished containers from preforms, the production line comprising a thermal conditioning installation produced according to the teachings of the invention.

Shown in FIG. 1 is a production line 10 of a large quantity of containers 12 of thermoplastic material. The finished containers 12 are obtained by the forming of preforms 14.

Each preform 14 is made of a thermoplastic material such as polyethylene terephthalate, more commonly known by its acronym "PET." The preforms 14 are obtained by, for example, injection molding.

At the end of their injection molding, the preforms 14 are abruptly cooled, for example by quenching, to impart to the thermoplastic material an amorphous state. It is thus possible to render the thermoplastic material again malleable by heating beyond a glass transition temperature.

Figure 2:
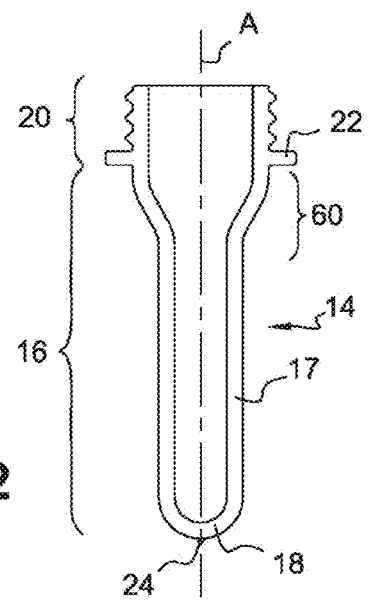
FIG. 2 is a profile view that shows a preform.

In FIG. 2, such a preform 14 has been shown in more detail. The preform 14 has a body 16 that has a tubular cylindrical wall 17 with a vertical main axis "A." With reference to FIG. 2, the body 16 is closed downward by a bottom 18 with a generally hemispherical shape. The body 16 is open axially upward through a neck 20.

The neck 20 has a tubular cylindrical shape that is coaxial to the axis "A" of the body 16. The neck 20 is already molded to its final shape. It is provided on its outer face with means for securing a cap, such as a threading. A radially projecting collar 22 marks the separation between the body 16 and the neck 20. Below, it will be seen that the collar 22 forms part of the neck 20.

The bottom 18 of the body 16 has, in the area of its intersection with the axis "A" of the preform 14, an injection point 24, corresponding to the injection point of the thermoplastic material during its molding. The injection-molding techniques do not make it possible to obtain a perfectly amorphous state for the thermoplastic material located at the injection point 24 and in its vicinity. The thermoplastic material that makes up the injection point 24 and its vicinity is thus in a semi-crystalline state.

Shown in FIG. 1 is the production line 10 that mainly comprises a thermal conditioning installation 26 and a forming station 28.

The thermal conditioning installation 26 is designed to heat, in series production, the body 16 of the preforms 14 beyond the glass transition temperature, while keeping the neck 20 of the preforms 14 at a temperature less than the glass transition temperature. This thus makes it possible to guarantee that the neck 20 will keep its final shape as obtained after injection, whereas the body 16 will be sufficiently malleable to allow its forming. The preforms 14 here are moved into the thermal conditioning installation 26 along a pre-defined thermal conditioning path that makes possible the movement of the preforms 14 from an entry point of the cold preforms 14 to an exit point of the hot preforms 14, near the forming station 28 during their thermal conditioning. Such an installation 26 will be described in more detail below.

The forming station 28 comprises numerous molding units 30 that are mounted here on a carousel 32 that makes possible the movement of the preforms 14 during their forming. Each molding unit 30 comprises a mold (not shown) intended to receive a thermally-conditioned preform 14, and means (not shown) for injecting a pressurized fluid into the preform 14 to allow the forming by expansion of the body 16 of the preform 14.

This expansion can be accompanied by an operation for stretching the preform 14 along its axis "A," for example by means of a stretching rod (not shown). This is particularly the case for a so-called "bi-oriented" forming.

Such a production line 10 makes it possible to produce containers 12 rapidly and in a large quantity.

A first embodiment of the thermal conditioning installation 26 will now be described in more detail with reference to FIGS. 3 and 4.

The thermal conditioning installation 26 comprises numerous elements 34 for holding a preform 14 by its neck 20. Each holding element 34 here is formed by an expansion mandrel that is designed to be inserted forcibly into the neck 20 of the preform 14.

Figure 3:
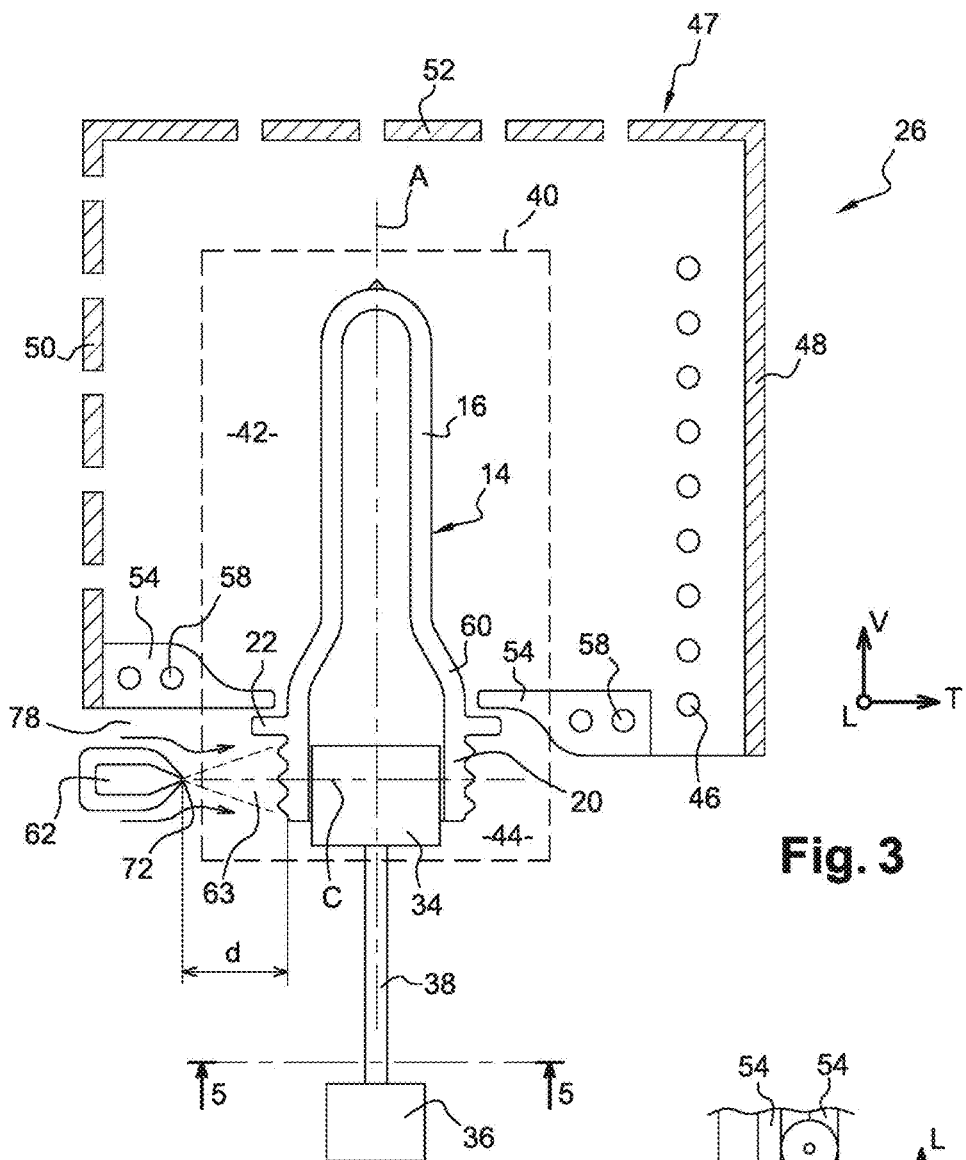
FIG. 3 is a transverse cutaway view that shows the thermal conditioning installation of FIG. 1 produced according to a first embodiment of the invention in which the neck of the preforms is cooled by a so-called "air knife" cooling device.

The holding elements 34 are mounted one behind the other on a transport means such as a line, of which a link 36 is shown in FIG. 3, so as to advance in the longitudinal direction "L" along a predetermined thermal conditioning path, at right angles to their vertical axis "A."

Each holding element 34 here is mounted on the link 36 by means of a rotating vertical shaft 38 that is coaxial to the axis "A" of the preform 14 that is carried by said holding element 34. The holding element 34 is thus able to be placed in rotation around its axis during the movement of the links 36, thus driving the rotation of the preform 14 carried around its axis "A" at a specific speed of revolution during its movement along the thermal conditioning path.

The thermal conditioning installation 26 also comprises a thermal conditioning zone 40 that is delimited transversely by the rectangular shape in broken lines of FIG. 3. The holding element 34 is designed to hold the preform 14 inside the thermal conditioning zone 40 during its movement along its thermal conditioning path.

The thermal conditioning zone 40 is specified as a zone in which the passage of an air flow is able to influence the surface temperature of the preforms 14 directly and perceptibly.

Figure 9:
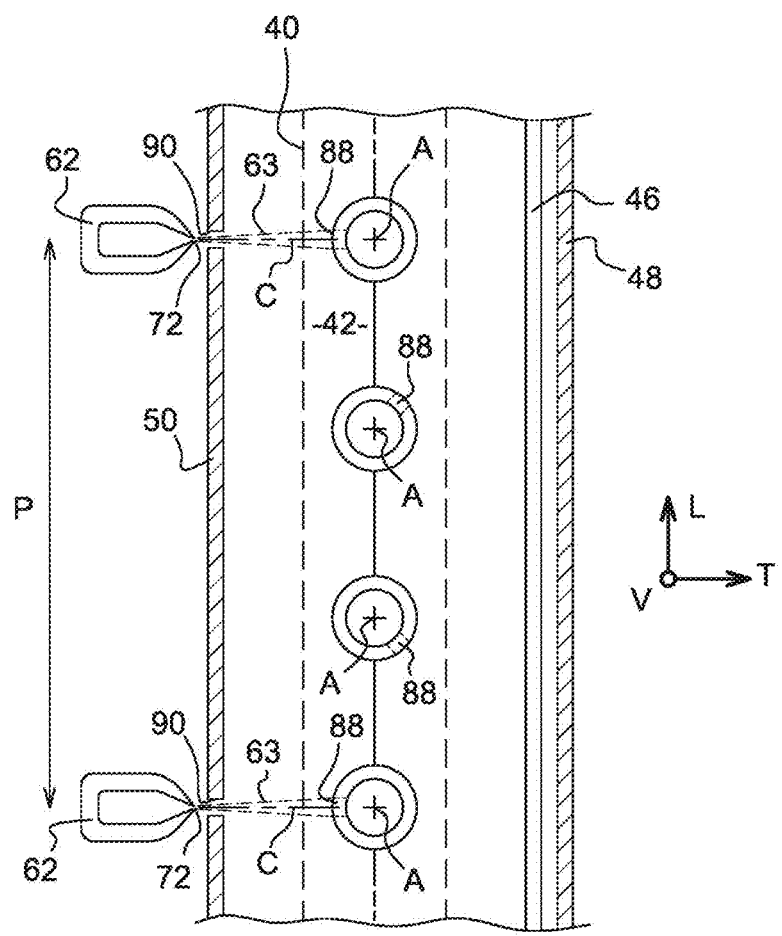
FIG. 9 is a horizontal cutaway view that passes through the tunnel of a thermal conditioning installation made according to a fifth embodiment of the invention in which a sector of the body of the preform is cooled by several so-called "air knife" cooling devices that produce a vertical blade of blown air that flows in a transverse direction.

Thus, the thermal conditioning zone 40 forms a longitudinal passageway through which the preforms pass at right angles to their vertical axis "A" by movement of the holding elements 34, as can be seen in particular in FIG. 9.

The thermal conditioning zone 40 is divided vertically into:
  a first heating part 42, which is shown here at the top in FIG. 3, and which is intended to accommodate the body 16 of the preform 14, and
  a second cooling part 44, which is positioned here at the bottom in FIG. 2, and which is designed to accommodate the neck 20 of the preform 14.

In the example shown in FIG. 3, the preforms 14 advance with their neck 20 oriented downward.

It will be understood that the invention is also applicable to an installation that makes possible the advance of the preforms in another orientation, particularly with their neck oriented upward.

The first heating part 42 is exposed to at least one heating element 46. The first heating part 42 is positioned in a heating chamber, hereinafter called "tunnel 47," which comprises the heating elements 46. The heating tunnel 47 is thus delimited transversely by two longitudinal vertical lateral partitions 48, 50.

In a nonlimiting way, the heating tunnel 47 here is closed toward the top by a horizontal partition 52.

In the example shown in FIG. 3, the heating elements 46 are formed by means for emitting infrared waves, for example lamps, which are positioned along the lateral partition 48 located on the right in FIG. 3.

The inner face of the partitions 48, 50, 52 is advantageously covered with a reflecting coating or material that makes it possible to concentrate the heating radiation emitted by the heating elements 46 toward the heating part 42.

As shown in FIG. 3, the contour of the heating part 42, in transverse cutaway, is positioned transversely to the center of the tunnel 47, near the heating elements 46. In the type of thermal conditioning installation 26 shown in the figures, the heating elements 46 are nevertheless positioned at a distance from the preform 14, outside of the thermal conditioning zone 40, to prevent the preforms 14 from being burned by a heating that is too intense.

The heating part 42 is open downward on the cooling part 44 to allow the advance of the preforms 14 astride the two parts 42, 44 of the thermal conditioning zone 40. However, to limit the transmission of heat, by radiation or by convection, from the heating part 42 to the cooling part 44, it is known to reduce this opening to a longitudinal passage that is barely larger than the diameter of the body 16 of the preform 14. For this purpose, two longitudinal rails 54 are positioned transversely on both sides of the thermal conditioning path, on the border between the two parts 42, 44.

So that these rails 54 are sufficiently effective to form a barrier to the heat, they are cooled by internal circulation of a cold heat-transfer fluid in an internal circuit 58.

Despite all of these precautions, the neck 20 of the preform 14 is still able to be heated either by the thermal radiation passing through the longitudinal passage, or by conduction of heat through the thermoplastic material between the body 16 and the neck 20.

To temper the neck 20, it is known to equip the thermal conditioning installation 26 with at least one device for cooling the neck 20 by producing a flow of air that passes through the thermal conditioning zone 40, and more particularly the cooling part 44. This flow of air will hereinafter be called "neck flow of air."

Nevertheless, the known cooling devices do not make it possible to obtain a cooling that is simultaneously effective, economical and precise.

Actually, it has been found that it has been very difficult to heat a segment 60 of the body 16 of the preform 14 located directly under the collar 22, so-called "under-neck segment 60," beyond the glass transition temperature, while keeping the neck 20, and more particularly the collar 22, below its glass transition temperature.

The known cooling means actually do not make it possible to obtain a neck flow of air that is focused in a sufficiently precise manner on the neck 20 without reducing the temperature of the under-neck segment 60.

The problem of the precision of the flow of air arises also for other portions of the preform 14, and more particularly for the bottom 18 of the preform 14. Actually, it is known to have a transverse flow of air circulate in the heating part 42 of the thermal conditioning zone 40 to make possible a homogeneous heating of the body 16 of the preform 14. This makes it possible in particular to prevent certain segments of the body 16 from being heated in too intense a manner. This flow of air will hereinafter be designated "body flow of air."

Now, the thermoplastic material that makes up the injection point 24 and its vicinity are in a semi-crystalline state. Because of this, the material that makes up the injection point 24 is not very stretchable. To be able to render the bottom 18 of the perform 14 sufficiently malleable for the forming operation, it is therefore necessary to heat the injection point 24 and its vicinity to a higher temperature than the rest of the body 16.

However, the body flow of air is not sufficiently directional to allow the precise adjustment of the temperature of the injection point 24 relative to the rest of the body 16; in other words, the turbulent air flow is not delimited in a sufficiently precise manner in relation to the ambient air.

The invention proposes solving this problem of precision of the flows of air by using a cooling device 62 that produces a blade 63 of blown gas having a laminar flow. The gas used here is air. Such a cooling device 62 is better known under its English language name "air knife" or under its literal translation "couteau d'air" ["air knife"].

Figure 4:
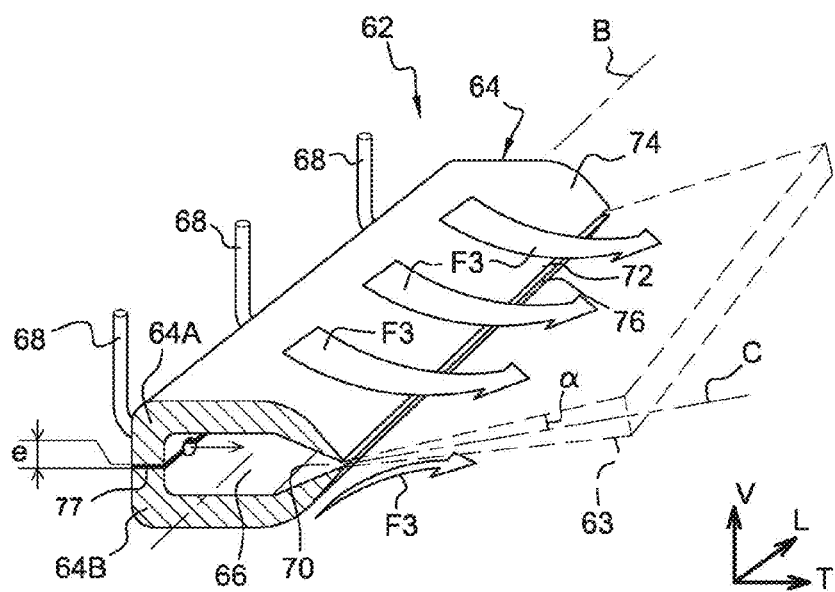
FIG. 4 is a perspective view with a cutaway that shows a so-called "air knife" cooling device that is attached to the thermal conditioning installation of FIG. 3.

An example of such a cooling device 62 is shown in FIG. 4. For purposes of the description, the cooling device 62 here is described in its positioning in FIG. 3. As will be seen later, the cooling device 62 will be able to occupy other positions in relation to the trihedron "L, V, T."

It appears in the form of a ramp 64, stretched out along a straight or curved axis "B," here oriented longitudinally, which encloses a pressure chamber 66. The pressure chamber 66 is stretched out over the entire length of the ramp 64. The pressure chamber 66 is closed at its two axial ends. The ramp 64 has, for example, a length of between 200 mm and 240 mm.

The pressure chamber 66 is supplied with compressed gas, here compressed air, at a pressure greater than the ambient pressure, for example 7 bars, by means of numerous supply pipes 68 that are distributed axially along a lateral side of the ramp 64.

Another lateral side, here delimiting transversely the pressure chamber 66, is shaped like a linear converging nozzle 70 that comes out, transversely here, to the outside by an axial outlet slot 72 for the blade of blown air. The slot 72 is parallel to the axis "B" of the ramp 64. In other words, the shape of the converging nozzle 70 is obtained geometrically by axial translation along the axis "B" of a transverse profile that converges from the chamber 66 toward the slot 72.

The slot 72 is delimited, vertically here, by two axial lips of the nozzle 70.

An upper outer face 74 and a lower outer face 76 of the nozzle 70 together present a profile that is converging transversely from the axis "B" of the ramp 64 toward the slot 72. More particularly, the outer faces 74, 76 of the nozzle 70 each have a transverse axial end edge that forms one of the lips of the slot 72.

The ramp 64 is divided here along a plane, here horizontal, which goes through the slot 72 in a first half-shell 64A, shown at the top in FIG. 4, and in a second half-shell 64B, shown at the bottom in FIG. 4.

The two half-shells 64A, 64B are attached in an airtight manner against one another with the interposing of a very fine wedge 77 that makes it possible to adjust the vertical opening "e" of the slot 72 between the two lips. Thus, the only opening for the air to exit is formed by the slot 72. The opening "e" is, for example, between 10 μm and 3 mm, and preferably between 10 μm and 100 μm.

The blade 63 of air produced by the cooling device 62 flows transversely along a transverse median plane from the slot 72. In a transverse cutaway, the blade 63 of blown air thus flows along a flow axis "C" that is oriented transversely. Because of the shape of the nozzle 70 and of the very reduced opening of the slot 72, in the area of the slot 72, the air flows very fast and in a non-turbulent manner. In other words, the nozzle 70 is designed to make it possible to accelerate the air flow in a laminar manner up to the slot 72.

The reduced opening of the slot 72 thus produces a directional blade 63 of air, i.e., the boundary between the flow of air flowing at high speed in the blade 63 of blown air and the ambient air is very clearly due to the absence of turbulence, at the very least to a so-called effective transverse distance from the outlet slot 72. The effective distance is, for example, between 15 mm and 150 mm. Beyond this effective distance, the flow of the blade 63 of blown air begins to become turbulent and to lose its directionality and speed until being diluted in the ambient air.

The blade 63 of blown air in addition has a reduced thickness making it possible to cool very localized portions of the preform 14. Thus, in a transverse cutaway, the blade 63 of blown air has a triangular shape diverging from the outlet slot 72 with a half-angle "α" at the apex that is very narrow on both sides of the flow axis "C." It is thus possible to focus the blade 63 of blown air on a precise portion of the preform 14. The half-angle "α" at the apex is, for example, between 7.5° and 20°, and, for example, 16.5°, [and] makes it possible to impart to the blade 63 of blown air a sufficient cooling precision relative to the dimensions of the preform 14.

Due to the converging shape of the nozzle 70, the air leaves from the slot 72 at a high velocity, for example between 20 m·s$^{-1}$ and 70 m·s$^{-1}$. The geometry of the outer faces 74, 76 of the nozzle 70 promotes the suction of ambient air by the blade 63 of blown gas by Venturi effect, as indicated by the arrows "F3" of FIG. 4. The blade 63 of blown air is thus able to multiply up to 40 times its initial flow rate by sucking the ambient air into its flow.

According to a first embodiment of the invention that is shown in FIG. 3, the blade 63 of blown air is used to cool the neck 20 precisely to keep it below its glass transition temperature without cooling the under-neck segment 60 of the body 16.

In this first embodiment, the outlet slot 72 of the cooling device 62 is positioned near the cooling part 44, the flow direction "C" of the blade 63 of blown air being pointed toward the neck 20 of the preforms 14.

Figure 5:
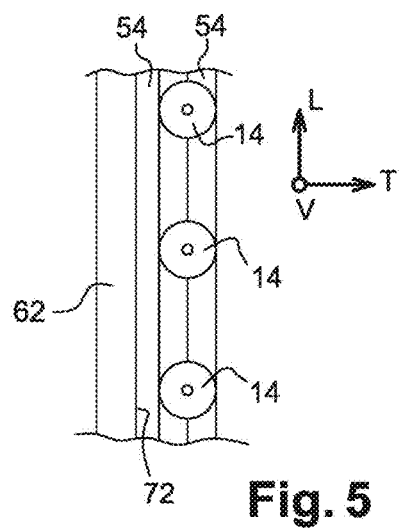
FIG. 5 is a horizontal cutaway view along the cutting plane 5-5 of FIG. 3 that shows the arrangement of the cooling device along the thermal conditioning path of the preforms.

To do this, the axial slot 72 of the cooling device 62 is oriented longitudinally, in a manner parallel to the longitudinal direction of movement of the preforms 14, as is illustrated in FIG. 5. This thus makes it possible for the same cooling device 62 to produce a blade 63 of blown air to cool simultaneously several preforms 14 on at least a fraction of the thermal conditioning path. The neck 20 of the preforms 14 is entirely cooled due to the specific rotation of the preforms 14 around their axis "A" during their advance.

According to this first embodiment of the invention, the outlet slot 72 is positioned vertically at the same height as the neck 20 of the preform 14. Thus, the flow axis "C" of the blade 63 of blown gas is perpendicular to the vertical axis "A" of the preform 14.

The slot 72 is positioned at a specific distance "d" from the neck 20. This distance "d" is chosen so that the neck 20 is cooled without the under-neck segment 60 being cooled by the blade 63 of blown air. This distance "d" is less than the effective distance so that the blade 63 of blown air remains directional and non-turbulent when it reaches the neck 20 of the preform 14. The distance "d" is, for example, between 5 mm and 50 mm.

In the example shown in FIG. 3, the cooling device 62 is positioned vertically under one of the rails 54 that border the passage. A gap 78 is maintained vertically between said rail 54 and the cooling device 62 to make possible the sucking of air between the rail 54 and the ramp 64 by the blade 63 of blown gas by Venturi effect, as indicated by the arrows of FIG. 3. This makes it possible to increase the air flow rate in the flow, thus increasing the efficiency of the cooling device 62.

Figure 6:
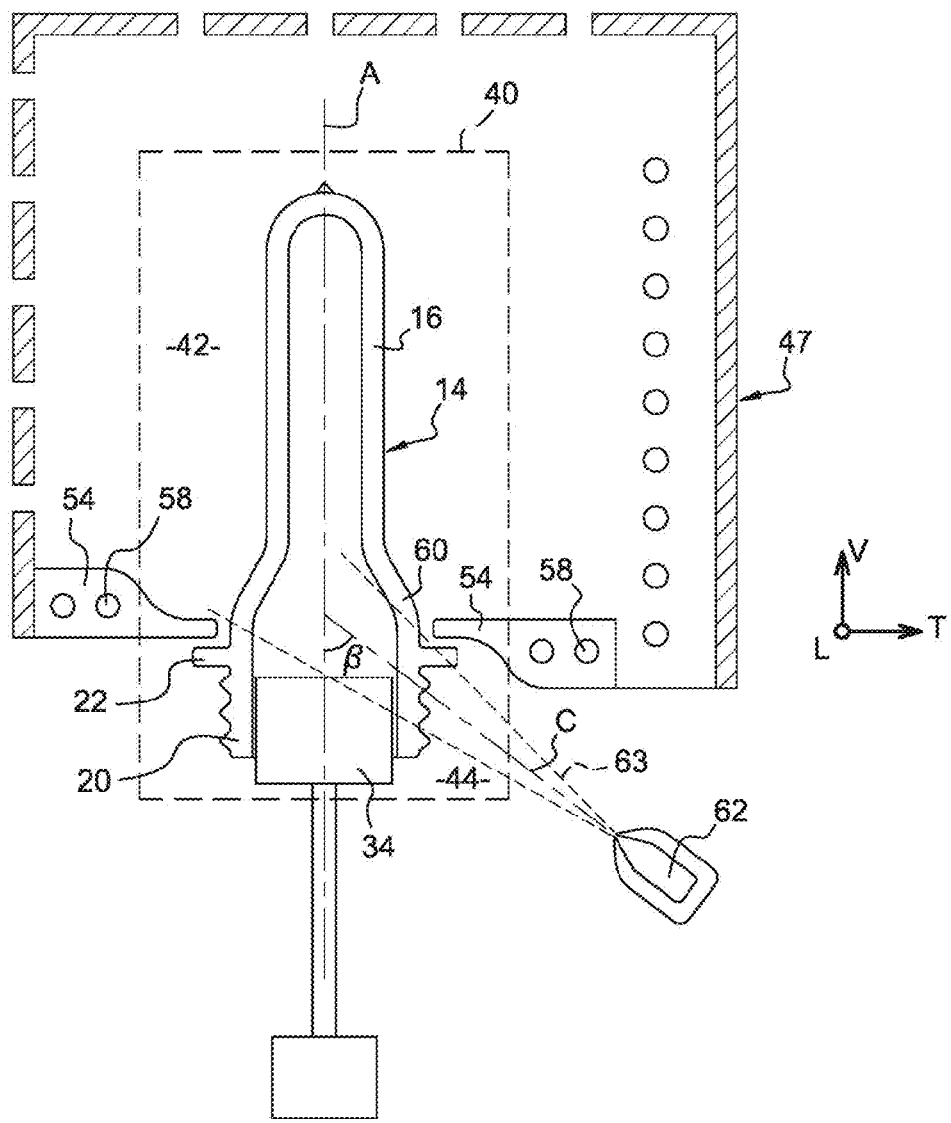
FIG. 6 is a view similar to that of FIG. 3 that shows a second embodiment of the invention in which the cooling device is inclined relative to the one of FIG. 3.

A second embodiment of the invention is shown in FIG. 6. This second embodiment is very close to the first embodiment because the cooling device 62 is also positioned near the cooling part 44 so as to cool the neck 20 of the preform 14 precisely.

The only difference between the first embodiment and the second embodiment is the following. The outlet slot 72 here is positioned vertically under the preform 14 so that the flow axis "C" of the blade 63 of blown gas forms, with the vertical axis "A" of the preform 14, an inclination angle "β" so that the flow axis "C" remains pointed toward the neck 20 of the preform 14.

It has been found that, surprisingly enough, the entire preform 14, i.e., the neck 20 and the body 16, was cooled in a manner suitable for the forming when the angle "β" was pointed, beyond the neck 20 of the preforms, toward the passage delimited between the two rails 54.

Actually, the blade 63 of blown air first of all reaches the neck 20 at full speed to cool it effectively. The collar 22 forms an obstacle that deflects the blade 63 of air, thus preventing it from cooling the under-neck segment 60. Then, the blade 63 of air follows its flow to the interior of the heating part 42, while passing between two consecutive preforms 14, causing an agitation of air that is favorable to the homogenization of the heating on the rest of the body 16 of the preform 14.

To benefit from this advantageous cooling, the blade 63 of air must be precisely oriented to pass between the two rails 54 without, however, touching the free edges of the rails 54. This would actually cause turbulence liable to cool the under-neck segment 60. Thus, only a cooling device of the "air knife" type can produce a blade 63 of blown air that is sufficiently precise to attain this advantageous and surprising cooling effect.

According to a variant, not shown, of the invention combining the first two embodiments, the cooling device 62 is mounted to move in the vicinity of the cooling part 44 between:
  a first position in which the flow axis "C" is oriented transversely in a manner identical to that which is described in the first embodiment, as illustrated in FIG. 3, and
  a second position in which the flow axis "C" is pointed toward the passage delimited between the two rails 54 in a manner identical to that which is described in the second embodiment, as illustrated in FIG. 6.

This variant thus makes it possible to adjust the inclination angle "β" of the cooling device 62 to adapt it to the desired heating profile for the preforms 14.

Another advantage of these first two embodiments is that the blade 63 of blown air is also directed toward the holding elements 34 to cool them when they are not protected by the neck 20 of a preform 14. Such a situation occurs in particular during the production start-up phase, during which the installation 26 goes up in temperature, or when a preform is missing, for example following a problem of grasping a preform by the holding element 34. The cooling caused by the blade 63 of blown air is sufficient to prevent various components of the holding element 34, particularly seals of elastomer material, from being damaged by the heat produced by the heating elements 46.

Figure 7:
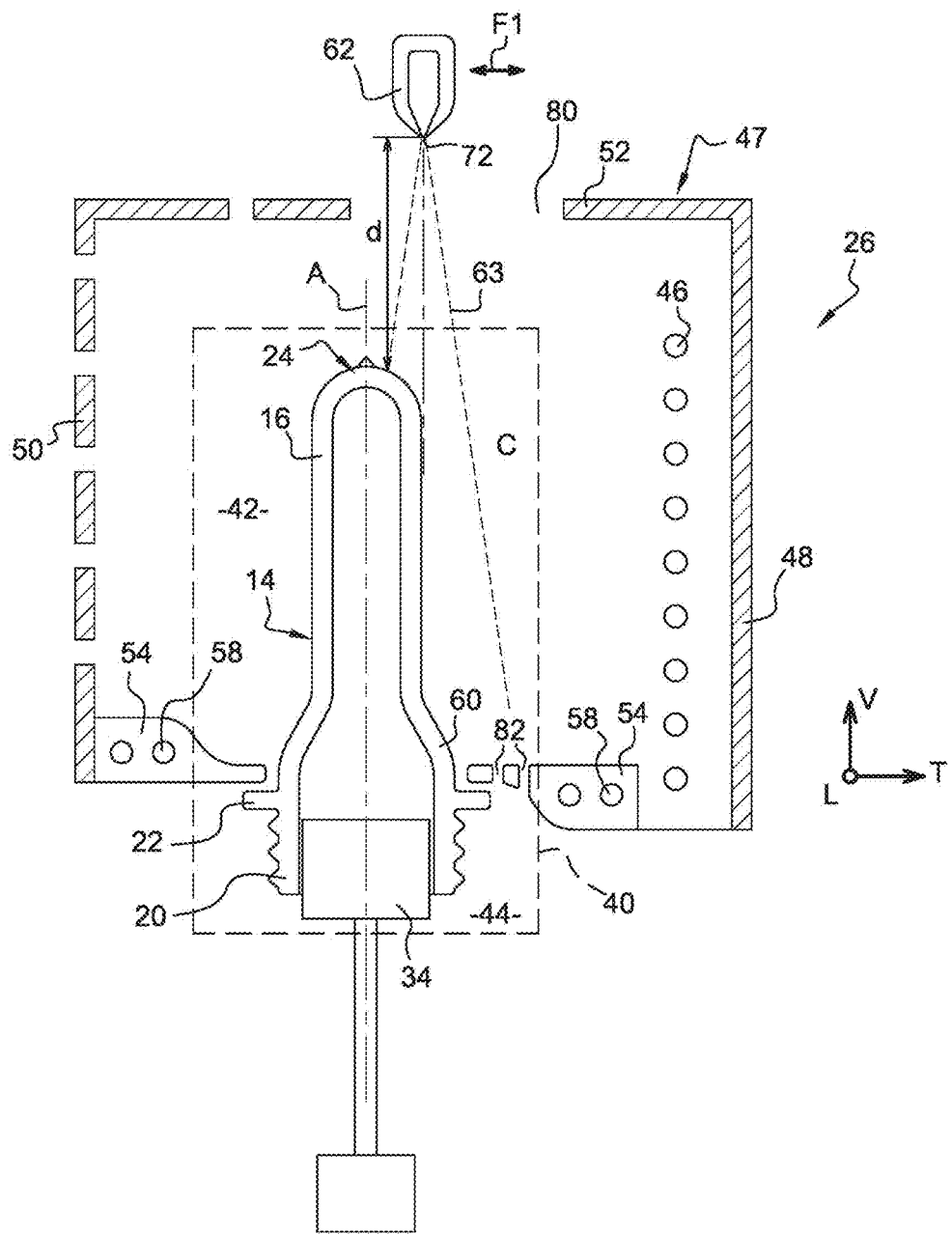
FIG. 7 is a view similar to that of FIG. 3 that shows a third embodiment of the invention in which the body of the preform is cooled by a so-called "air knife" cooling device that produces a blade of blown air that flows vertically.

According to a third embodiment of the invention that is shown in FIG. 7, the blade 63 of blown gas is injected directly into the heating part 42 to cool specifically the body 16 of the preform 14.

As in the first two embodiments, the axial slot 72 of the cooling device 62 is oriented longitudinally, in a manner parallel to the direction of movement of the preforms 14. This makes it possible for the same blade 63 of blown air to cool simultaneously several preforms 14 on at least one fraction of their thermal conditioning path.

The flow axis "C" of the blade 63 of blown gas is directed parallel to the vertical axis "A" of the preform 14. In the example shown in FIG. 7, the cooling device 62 is positioned above the upper partition 52 of the tunnel 47.

The blade 63 of blown air passes to the interior of the tunnel 47 to reach the heating part 42 thanks to a traversing groove 80 made in the upper partition 52. The blade 63 of blown air thus moves from top to bottom, from the bottom 18 of the preform 14 toward its neck 20.

As a variant, not shown, of the invention, the cooling device is positioned under the rails, the blade of blown air then moving from the bottom to the top, from the under-neck segment toward the bottom of the preform.

In the example shown in FIG. 7, the slot 72 is slightly offset transversely, here toward the left, in relation to the axis "A" of the preform 14 so that the blade 63 of blown gas is tangent with the body 16 of the preform 14. Thus, the blade 63 of blown air thus licks the body 16 of the preform 14 without, however, cooling the injection point 24 and its vicinity. Due to the specific rotation of the preforms 14 during their advance, the entire body 16 of the preform 14 is exposed cyclically to the blade 63 of blown air.

In this configuration, the blade 63 of blown air is focused so as to cool effectively the body 16 of the preform 14.

The installation 26 also has vents 82 that are positioned opposite the outlet slot 72 in relation to the heating part 42 to make possible the venting of the blade 63 of blown gas from the tunnel 47.

In the example shown in FIG. 7, the vents 82 are made in the rail 54 that is positioned vertically to the right of the cooling device 62.

Advantageously, a transverse flow of air, produced according to the first embodiment of the invention or according to the state of the art, is provided to carry the hot air leaving by the vents 82 far from the neck 20.

According to a variant, not shown, of the invention, the cooling device 62 is positioned so that the axis "C" of the blade 63 of blown gas is positioned at a specific transverse distance from the surface of the body 16 of the preform 14. The flow axis "C" remains, however, in the heating part 42 of the thermal conditioning zone 40.

In this way, the body 16 of the preform 14 is cooled by the suction of hot ambient air in contact with the preform 14, by Venturi effect.

However, care must be taken that the flow axis "C" is not too transversely separated from the preform 14. Actually, it has been found that in the case of too considerable a separation, the blade 63 of blown air came into contact with the under-neck segment 60 of the preform 14 with too much force, causing an unwanted cooling of said segment 60. For example, the flow axis "C" of the blade 63 of blown air is separated transversely in relation to the axis of the preform by a maximum distance equal to the radius of the body of the preform.

To make it possible to adjust the transverse separation between the axis "A" of the preform 14 and the flow axis "C," the cooling device 62 is advantageously mounted to slide transversely, as indicated by the double arrow "F1" of FIG. 7. For this purpose, the transverse width of the groove 80 is adapted to the transverse adjustment travel of the cooling device 62. This makes it possible in particular to modulate the cooling effect of the body 16 by the blade 63 of blown air, but also to be able to adjust the blade 63 of blown air to preforms 14 that have different diameters.

The positioning of the cooling device 62 according to this third embodiment makes it possible to cool the portions of the body 16 of the preform 14 that have need of it, without, however, cooling either the injection point 24 or the under-neck segment 60. This is particularly made possible by the precision and the directionality of the blade 63 of blown air produced by the cooling device 62.

Actually, the transverse offsetting of the flow axis "C" in relation to the axis "A" of the preform 14 is enough to ensure that the blade 63 of blown air does not touch the injection point 24, while reaching a section of the body 16.

Figure 8:
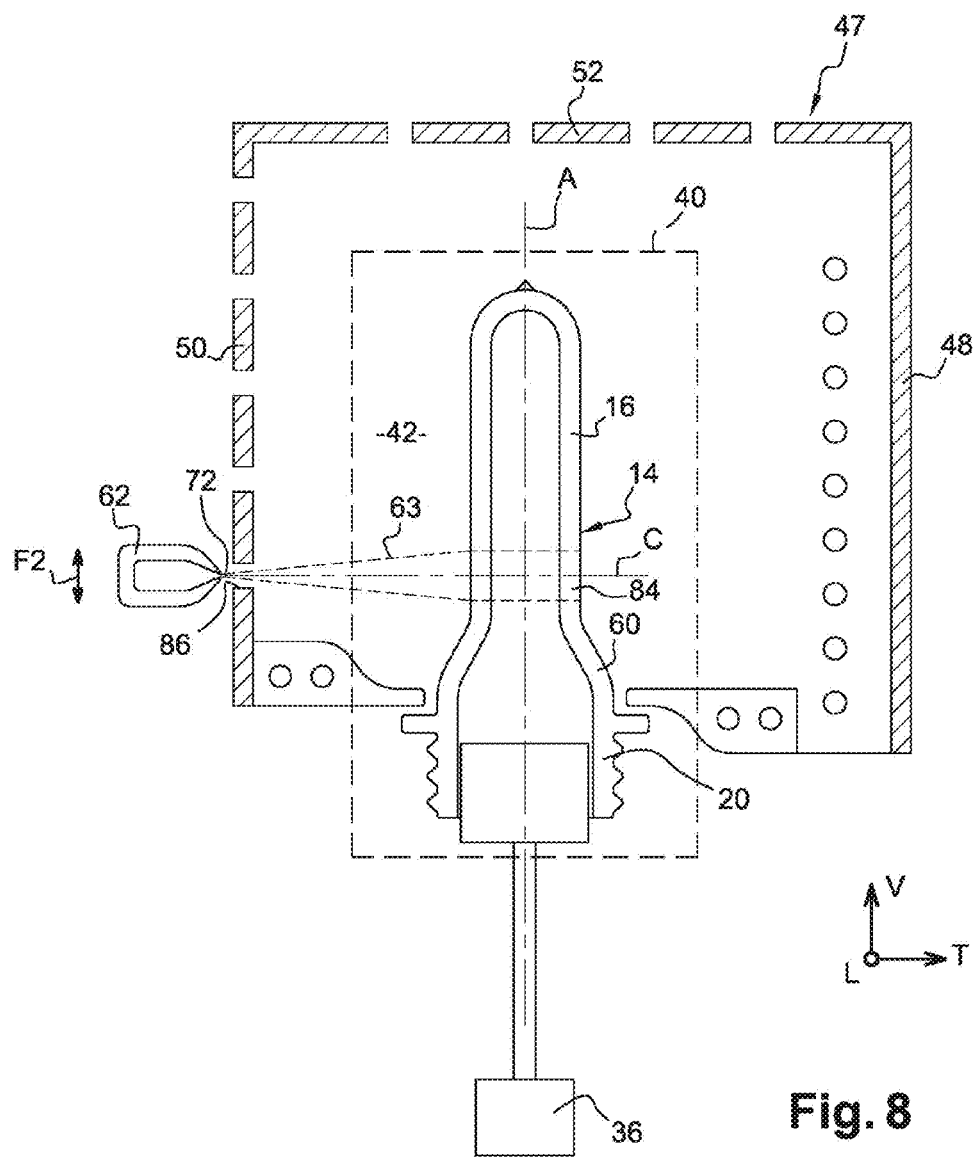
FIG. 8 is a view similar to that of FIG. 3 that shows a fourth embodiment of the invention in which a segment of the body of the preform is cooled by a so-called "air-knife" cooling device that produces a blade of blown air that flows horizontally.

A fourth embodiment of the invention has been shown in FIG. 8. In this embodiment, it is sought to cool in a more intense manner a specific segment 84 of the body 16 of the preform 14. Such an operation is known in the field of the forming of containers under the name of "preferential heating" or "black bar."

Such an operation is particularly required when the finished container to be obtained has a complex shape having a segment 84 forming narrowing around the axis "A" of the container in a central part of the body. To make it possible to attain such a result, it is preferable that the segment 84 that forms the narrowing be less heated than the rest of the body 16 to make it possible to obtain a container having a wall of homogeneous thickness. This segment 84 of the body 16 designed to form narrowing will be named hereinafter "segment 84 to be cooled."

Until now, such an operation was performed by moving one of the heating lamps 46 back and/or by using a screen to conceal the heating radiation in the area of the segment 84 to be cooled.

In this fourth embodiment of the invention, it is proposed to use the cooling device 62.

As in the first three embodiments, the axial slot 72 of the cooling device 62 is oriented longitudinally, in a manner parallel to the direction of movement of the preforms 14. This makes it possible for the same blade 63 of blown air to cool simultaneously several preforms 14 over at least a fraction of their thermal conditioning path.

The cooling device 62 here is positioned transversely just behind the left lateral partition 50 of the tunnel 47, i.e., opposite in relation to the heating elements 46.

The slot 72 is more particularly positioned vertically at the same level as the segment 84 to be cooled. The flow axis "C" of the blade 63 of blown gas is oriented perpendicular to the vertical axis "A" of the preforms 14 so as to ensure that the blade 63 of blown air is pointed toward the segment 84 to be cooled of the body 16 of the preforms 14.

The blade 63 of blown air enters into the tunnel 47, and more particularly into the heating part 42, thanks to a longitudinal through-groove 86 made in the left lateral partition 50.

Since the blade 63 of blown air is particularly directional and precise, it makes it possible to cool precisely the segment 84 to be cooled without affecting the temperature of the rest of the body 16.

Advantageously, the cooling device 62 is mounted to move vertically, as indicated by the arrow "F2" of FIG. 8, to make it possible to select the segment 84 of the body 16 to be cooled. This makes it possible to produce runs of different models of containers with the same thermal conditioning installation 26.

A fifth embodiment of the invention has been shown in FIG. 9.

Just as in the fourth embodiment, the objective of this fifth embodiment of the invention is to make possible a preferential heating of specific portions of the preform 14. However, the specific portion here is formed by an angular sector 88 of the body 16 of the preform 14 around its axis "A."

Such a preferential heating operation is used particularly to make non-axisymmetrical finished containers, for example containers that are "flattened" in a preferential radial direction.

Until now, such an operation was performed by using a screen to conceal the heating radiation in the area of the sector 88 to be cooled.

In this fifth embodiment of the invention, it is proposed to use several cooling devices 62, of the "air knife" type, similar to the one that has been described previously.

As has been explained previously, the preforms 14 advance into the thermal conditioning zone 40 while rotating on themselves at a specific speed of revolution. In general, the angular position of the preforms 14 around their axis "A" is a function of the longitudinal position of the holding element 34 along the thermal conditioning path. For example, the preforms 14 are driven in rotation by means of a gear-wheel (not shown) that is secured in rotation with the holding element 34 around the axis "A," the gear-wheel meshing with a fixed toothed rack (not shown) that is positioned along the thermal conditioning path.

It is therefore easy to know the step "P" by which a preform 14 must advance along the thermal conditioning path to accomplish a complete revolution.

The thermal conditioning installation 26 here comprises numerous identical cooling devices 62, of which two have been shown in FIG. 9. Each cooling device 62 is positioned transversely behind the left lateral partition 50, outside of the tunnel 47.

Each cooling device 62 is positioned so as to ensure that the outlet slot 72 is oriented vertically, i.e., parallel to the axis "A" of the preforms 14.

Each blade 63 of blown gas is injected directly into the heating part 42, inside the tunnel 47, thanks to a transversing vertical groove 90 made in the left lateral partition 50.

The flow axis "C" of each blade 63 of blown gas is normally oriented in the direction of advance of the preforms 14. The outlet slot 72 has a length at least equal to the vertical height of the body 16 of the preform 14 so that the blade 63 of blown air cools the entire sector 88 to be cooled.

The outlet slots 72 of two adjacent cooling devices 62 are separated longitudinally by the specific step "P" so as to ensure that the section 88 to be cooled of the body 16 of each preform 14 is cooled consecutively by each blade 63 of blown gas.

Thus, during the operation of the installation, a first preform 14 advances along the thermal conditioning path while rotating about itself. When it intersects the blade 63 of blown air that is produced by the first cooling device 62, the section 88 to be cooled is in the flow axis "C," transversely opposite the outlet slot 72. Then, the preform continues its route between the two blades 63 of blown air while rotating about itself. The sector 88 to be cooled in particular faces the heating elements 46 located on the opposite partition 48. At the end of a complete revolution, the preform 14 intersects the blade 63 of blown air produced by the next cooling device 62, the sector 88 to be cooled being positioned in the flow axis "C" opposite the outlet slot 72. The sector 88 to be cooled thus loses a portion of the accumulated heat opposite the heating elements 46. Thus, at the exit of the thermal conditioning installation 26, the sector 88 to be cooled has a temperature that is considerably less than that of the rest of the body 16.

The cooling of a well-defined sector 88 of the preform 14 is possible thanks to the precision and the directionality of the blade 63 of blown air produced by such a cooling device 62.

According to a variant of the invention that is applicable to all of the embodiments previously described, the cooling of certain specific portions of the preform is applicable to a thermal conditioning installation having a structure that is different from the one given as an example. Thus, the heating elements can be formed by rings of microwave radiation emission, as is described in more detail in the document US-A1-2010/0052224.

The thermal conditioning installation 26 made according to the teachings of the invention thus makes it possible to cool precisely and very effectively well-defined portions of the preforms 14, whether this be the neck 20 or the body 16.

Also, the use of an "air-knife"-type cooling device 62 has numerous other advantages. Thus, such a device 62 is minimally bulky in relation to the imposing known ventilation systems of the state of the art.

Also, such a cooling device 62 is not very noisy relative to the cooling means that is already known to be used on thermal conditioning installations.

Moreover, such a cooling device 62 has a much greater efficiency than the efficiency of the known cooling devices of the state of the art. This is explained in particular by the directional and precise aspect of the blade 63 of blown air as well as by the increase of the flow rate by Venturi effect after the exit of the blade 63 of air from the outlet slot 72.

It will be understood that the different embodiments previously described can be combined with one another or with known cooling devices of the state of the art.

The invention claimed is:

1. A thermal conditioning installation, in series production, of cold preforms of thermoplastic material configured to be transformed into finished containers by forming, each preform having a vertical main axis that goes through a neck, the installation comprising:
   at least one holding device configured to hold a preform by the neck in a thermal conditioning zone, the thermal conditioning zone being divided vertically into a first heating part that is configured to accommodate a body of the preform, the first heating part being exposed to at least one heating device configured to heat the body of the preform, and a second cooling part that is configured to accommodate the neck of the preform; and
   at least one cooling device configured to cool at least one portion of the surface of the preform by producing a gas flow that passes through the thermal conditioning zone, the at least one cooling device producing a blade of blown gas having a laminar flow through an axial outlet slot that is at right angles to its direction of flow, the at least one cooling device being configured such that the produced blade of blown gas still has a laminar flow when the produced blade of blown gas reaches the preform.

2. The installation according to claim 1, wherein the cooling device has a pressure chamber that is supplied with compressed gas, one side of pressure chamber forming a linear converging nozzle that comes out through the outlet slot of the blade of blown gas.

3. The installation according to claim 2, wherein the thermal conditioning zone forms a passageway through which the preforms pass at right angles to their vertical axis by movement of the at least one holding device.

4. The installation according to claim 3, wherein the heating part and the cooling part are separated by two longitudinal separation rails that transversely delimit a longitudinal passage to enable the advance of the preforms astride the heating and cooling parts of the thermal conditioning zone.

5. The installation according to claim 4, wherein the outlet slot for the blade of blown gas is oriented parallel to the direction of movement of the preforms.

6. The installation according to claim 5, wherein the outlet slot of the cooling device is positioned in the vicinity of the cooling part, the direction of flow of the blade of blown gas being pointed toward the neck of the preforms.

7. The installation according to claim 6, wherein the outlet slot is disposed vertically at the same height as the neck of the preforms, the direction of flow of the blade of blown gas being perpendicular to the vertical axis of the preform.

8. The installation according to claim 4, wherein the outlet slot is disposed vertically under the neck of the preform, the direction of flow of the blade of blown gas forming, with the vertical axis of the preform, an angle of inclination, the direction of flow being pointed, beyond the neck of the preform, toward the passage delimited between the two rails.

9. The installation according to claim 6, wherein the cooling device is mounted to move between a first position in which the direction of flow is oriented transversely, and a second position in which the direction of flow is pointed toward the passage delimited between the two rails.

10. The installation according to claim 6, wherein the cooling device is positioned under one of the rails.

11. The installation according to claim 10, wherein a gap is maintained between the rail and the cooling device to enable the suction of air, by Venturi effect, between the rail and the cooling device by the blade of blown gas.

12. The installation according to claim 5, wherein the blade of blown gas is injected directly into the heating part.

13. The installation according to claim 12, wherein the direction of flow of the blade of blown gas is directed parallel to the vertical axis of the preform.

14. The installation according to claim 13, wherein the blade of blown gas is tangent to the body of the preform.

15. The installation according to claim 13, wherein the axis of flow of the blade of blown gas is positioned at a specific transverse distance from the surface of the preform.

16. The installation according to claim 13, wherein the outlet slot is mounted to slide transversely to enable adjusting the transverse position of the blade of blown gas in the heating part.

17. The installation according to claim 13, wherein the direction of flow of the blade of blown gas is perpendicular to the vertical axis of the preform, the blade of blown gas being pointed toward a specific segment to be cooled of the body of the preform.

18. The installation according to claim 17, wherein the outlet slot is mounted to move vertically to enable selecting the segment to be cooled of the body.

19. The installation according to claim 3, wherein the preforms pass through the thermal conditioning zone while rotating about themselves at a specific speed of revolution,
   the at least one cooling device includes a plurality of cooling devices, the outlet slot of each of said cooling devices being positioned parallel to the axis of the preforms, each blade of blown gas being injected directly into the heating part,
   the direction of flow of each blade of blown gas being oriented normally in the direction of advance of the preforms, the blades of blown gas being separated from one another by a specific span so as to ensure that a specific section of the body of each preform is cooled successively by each blade of blown gas.

20. The installation according to claim 12, further comprising vents that are positioned opposite the outlet slot in relation to the heating part to enable the venting of the blade of blown gas from the heating part.

21. The installation according to claim 1, wherein the at least one cooling device is configured such that the produced blade of blown gas is laminar along an effective distance of at least 15 mm.

* * * * *